Patented July 25, 1950

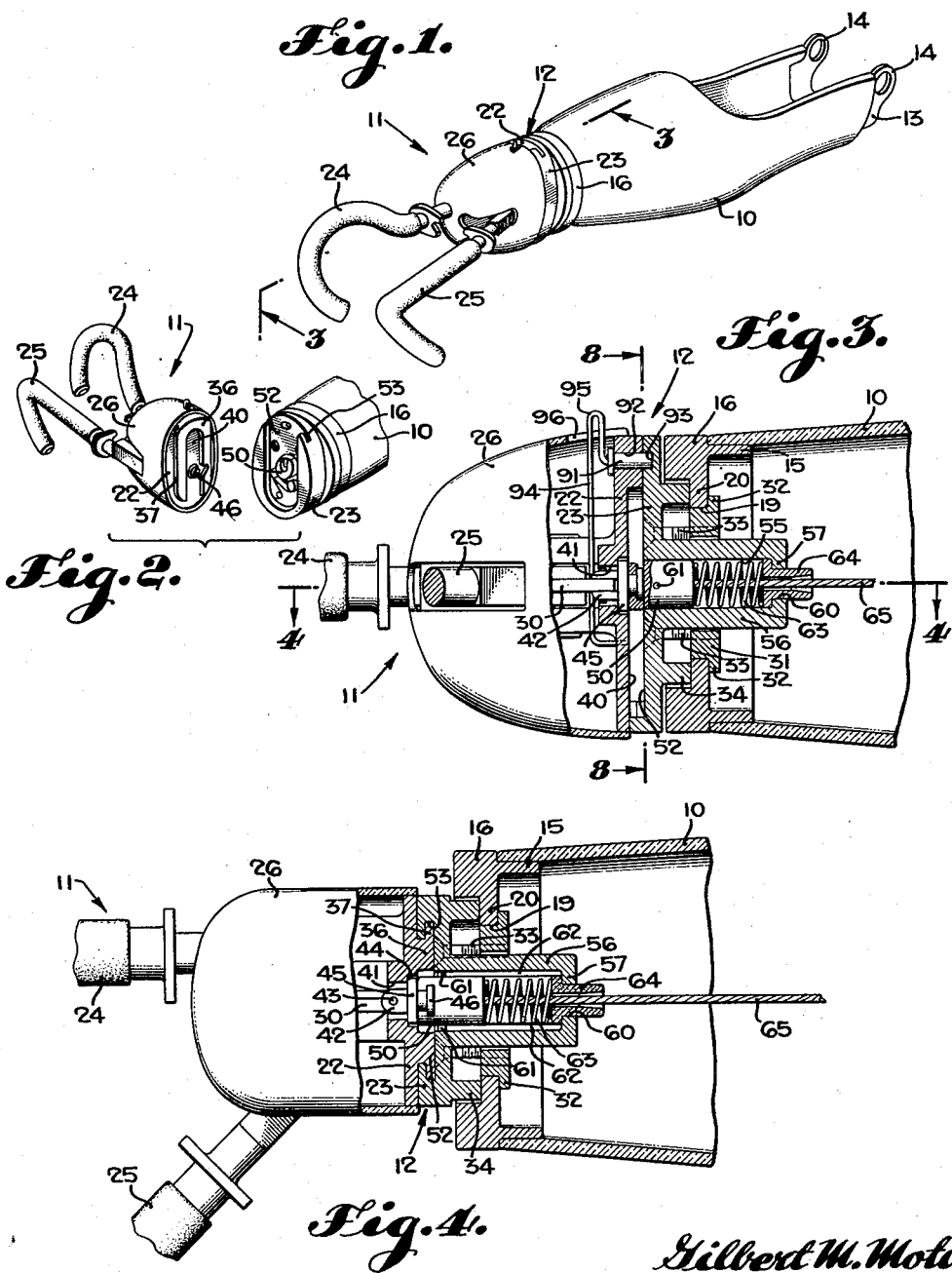

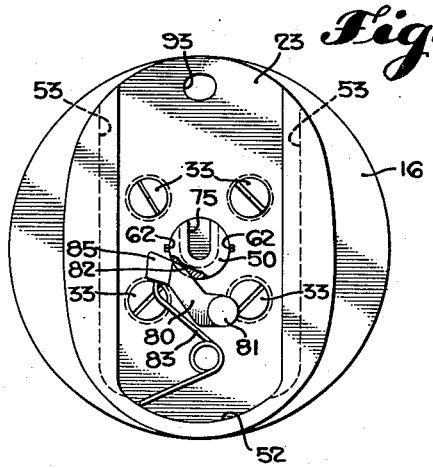
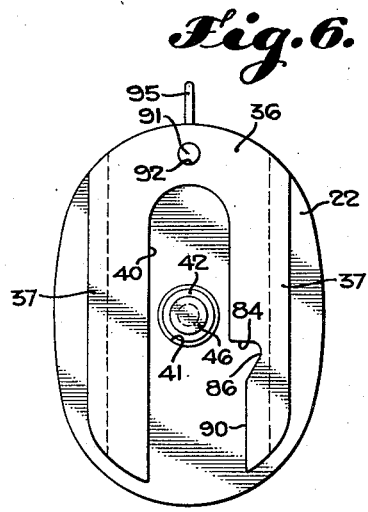
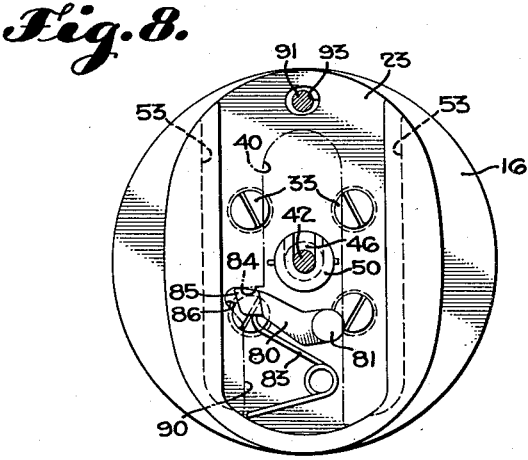
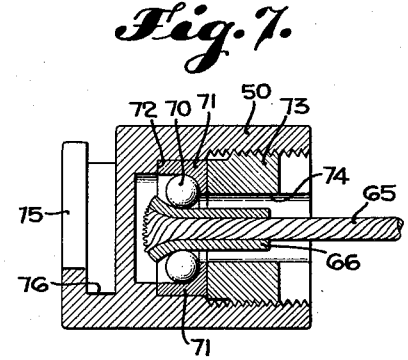
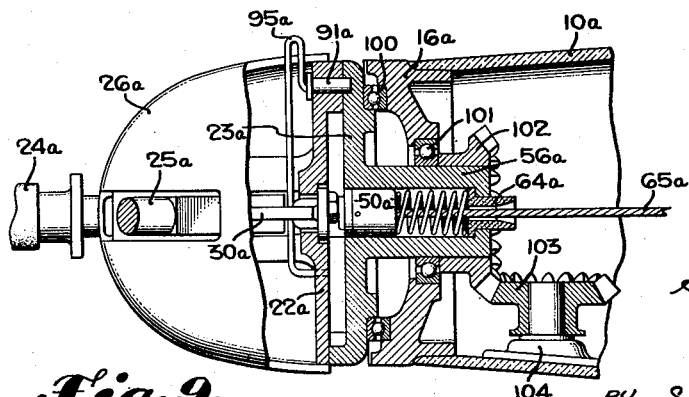

2,516,792

UNITED STATES PATENT OFFICE 2,516,792

QUICK DISCONNECT COUPLING FOR ARTIFICIAL HANDS OR HOOKS

Gilbert M. Motis, Burbank, Calif., assignor to Northrop Aircraft, Inc., Hawthorne, Calif., a corporation of California Application May 1, 1948, Serial No. 24,598

8 Claims. (Cl. 3—12)

The present invention relates generally to prosthetic devices, and more specifically to a quick-disconnect coupling adapted for use in the attachment of an artificial hand or hook to the distal end of a forearm member. Such quick-disconnect couplings are particularly useful where it is desired to change rapidly from hook to hand, or vice versa.

One of the primary objects of the invention is to provide a disconnectable coupling device that is especially designed to enable the bi-lateral amputee to operate the same without assistance. In many instances, particularly where the amputation is above the elbow, the amputee has no appreciable rotation available at the wrist and, therefore finds it difficult or impossible to operate prior disconnectable couplings having a rotary engagement, without assistance. The present invention overcomes this difficulty by providing a straight-line sliding engagement of the separable parts, which enables the amputee to place the hand or hook on a table top and then press downwardly on the wrist, sliding the wrist coupling member out of engagement with its companionate member on the hand or hook.

Another object of the invention is to provide a quick-disconnect coupling for artificial hands or hooks, having means for automatically coupling the actuating mechanism of the hook or hand to the control cable in the forearm member when the hook or hand is pushed down into full seating engagement with its companionate member; and which automatically uncouples the two parts when the hook or hand is disengaged from the said member. In this same connection, one of the features of the invention is the provision of a locking device on the wrist unit member, which is engageable with the corresponding coupling member as the hand or hook is removed, to lock the said coupling member in a fixed position, accurately located to be engaged properly by the companionate connector when the hook or hand is replaced. The locking device is operative to engage the coupling member before the connector becomes disengaged therefrom, and disengages the coupling member after the connector has become interlocked therewith. Thus, the coupling member is never entirely free from either the connector or the locking device, and therefore cannot become misalined with respect to the connector when the hook or hand is being slipped onto the wrist unit member.

Still a further object of the invention is to provide a quick-disconnect coupling for attaching a hand or hook to a rotatable wrist unit, and embodying a disconnectable force-transmitting member which is located substantially at the axis of rotation of the wrist unit, whereby the hook or hand can be rotated without displacing the force-transmitting member or otherwise adversely affecting the operation of the actuating mechanism thereof.

The foregoing and other objects and advantages of the invention will become apparent to those skilled in the art upon consideration of the following detailed description of the preferred embodiment thereof, reference being had to the accompanying drawings, wherein:

Figure 1 is a perspective view of an artificial arm having a hook mounted thereon by a coupling embodying the principles of the invention;

Figure 2 is a fragmentary view of the same, showing the hook removed from the wrist unit of the forearm;

Figure 3 is an enlarged vertical section, taken substantially along the lines 3—3 in Figure 1;

Figure 4 is a horizontal section, taken along the line 4—4 in Figure 3;

Figure 5 is an end view of the attach plate at the wrist end of the forearm member;

Figure 6 is an end view of the companionate plate member forming the back end of the hook or hand unit;

Figure 7 is an enlarged vertical section through the coupling member, by means of which the control wire is connected to the actuating mechanism of the hand or hook;

Figure 8 is a view similar to Figure 5, with the base plate of the hook or hand superimposed thereon in phantom lines, showing the manner in which the locking lever for the coupling member is disengaged from the latter when the base plate is fully engaged on the attach plate of the wrist unit; and Figure 9 is a vertical section through a modified form of the invention.

Reference is had first to Figures 1 to 8, inclusive, of the drawings, wherein the reference numeral 10 designates a forearm member to which a hook unit 11 is attached by means of a coupling device 12. In the preferred form illustrated in the drawings, the forearm 10 comprises a shell made up of plastic-impregnated fabric which is molded over suitable plaster forms and then cured in an oven. Bonded to the upper end of the forearm shell 10 is a saddle 13 having ears 14 at opposite sides thereof which are apertured to receive an elbow hinge pin (not shown). The outer, or distal end of the forearm shell 10 is bonded to an annular flange 15 projecting rearwardly from the back of a wrist cap 16. The wrist cap is also provided with an inwardly extending radial flange 20, the inner edge of which defines a central opening 19.

The coupling device 12 of the invention comprises two companionate plates 22 and 23 which are adapted to interlock in a straight-line relative sliding motion perpendicular to the axis of the forearm member 10, as will be described in more detail presently. Plate 22 is affixed in any suitable manner to the back of the hook unit 11, and may constitute the base of the hook unit, as shown. Mounted on the base plate 22 and projecting outwardly therefrom are a stationary hook 24 and a movable hook 25, the latter being pivoted for swinging movement toward and away from the stationary hook. Suitable actuating mechanism (not shown) is provided for operating the movable hook 25, either to open or close the same. The aforesaid actuating mechanism is enclosed within a housing 26 which is attached to the edges of the plate 22. Since the details of the hook unit and actuating mechanism form no part of the present invention, they have been omitted herefrom, and it is deemed sufficient to designate a link 30 as the first element in the actuating mechanism, it being understood that the application of a force to the link 30 will cause the movable hook 25 to open or close, as the case may be.

Plate 23, hereinafter referred to as the attach plate, is mounted on the wrist cap 16 of the forearm member, and may be either stationary or rotatable with respect thereto. In Figures 3 and 4, the attach plate 23 is relatively stationary, although provision is made for adjusting the angular position of the hook unit about the longitudinal axis of the forearm member. In Figure 9 the attach plate, designated at 23a, is rotatable with respect to the forearm member about the pronation-supination axis of the wrist. Referring back to Figures 3 and 4, I show the attach plate 23 secured to the wrist cap 16 by means of a clamp ring 31 having a radial flange 32 which is adapted to be clamped against the back side of the flange 20 of wrist cap 16. The clamp ring 31 is drawn against the flange 20 by means of four screws 33 which extend rearwardly through holes in the face of the attach plate 23 and are threaded into tapped holes in the clamp ring 31. An annular rib 34 projects from the back of the attach plate 13 and bears against the front face of flange 20, so that the latter is clamped between the two parts 31, 34, to secure the attach plate 23 solidly thereto. Angular adjustment of the hook unit 11 about the forearm axis is obtained by loosening the four screws 33 and then turning the unit to the desired position, after which the screws are again tightened.

Projecting rearwardly from the back surface of the base plate 22 is a flat, vertically extending rib 36, the opposite side edges of which are straight and parallel, and formed with outwardly facing flanges 37. A shallow, vertically extending slot 40 is milled out of the center of the rib 36, said slot being open at the bottom end and preferably, although not necessarily, closed at the top. A circular hole 41 is provided in the center of the plate 22, and disposed within this hole is a connector 42 which is connected by a pin 43 to the rear end of the link 30. The hole 41 is counterbored at 44 to receive an annular shoulder 45 on the connector, which limits the forward movement of the latter through the hole. The connector 42 projects beyond the face of the plate 22 and has a radially projecting circular flange 46 on the end thereof which is adapted to be received within a slot in the end of a coupling member 50, to be described presently.

The attach plate 23 has a shallow, vertically extending recess 52 formed in the outer face thereof to receive the rib 36 of the base plate, the top end of the recess being open to enable the rib to be slidably inserted therein. The side edges of the recess 52 are straight and parallel, and have channels 53 formed therein which are adapted to receive the flanges 37 of the base plate 22.

Opening into the bottom of the recess 52 at the center of the attach plate 23, substantially on the longitudinal axis of the forearm member 10 and also substantially coaxial with the axis of rotation of the attach plate relative to the wrist cap 16, is a cylindrical bore 55 within which the coupling member 50 is slidably disposed. The bore 55 extends rearwardly through a tubular extension 56, and terminates at an inwardly turned flange 57, the inner edge of which defines a hole 60. The tubular extension 56 may be formed integrally with the attach plate 23, as shown, or it may be made in several parts to facilitate manufacture.

The coupling member 50 is prevented from turning within the bore 55 by means of two diametrically opposed pins 61 which project from opposite sides of the coupling member and are slidable within longitudinally extending slots 62 in the sides of the bore. A spring 63 engages the rear end of the coupling member 50 and urges the same outwardly, or to the left, as viewed in Figures 3 and 4. The other end of the spring 63 abuts against a flanged fiber bushing 64 which is inserted through the hole 60.

Connected to the coupling member 50 and extending rearwardly through the center hole in the bushing 64 is a control wire 65 that is operatively connected at its other end to the shoulder harness of the amputee, in a manner well known in the art, whereby a shrug of the shoulder produces a pull on the wire. In the preferred form illustrated, the control wire 65 is represented as the tension transmitting wire of a Bowden cable, although it will be understood that any other force-transmitting element might be used in its place, and for that reason the wire 65 is referred to in the claims as a "control member."

The connection of the control wire 65 to the coupling member 50 is best illustrated in Figure 7. The control wire 65 extends into a cavity in the rear end of the coupling member 50 and has a sleeve 66 swaged onto the end thereof. The outer end of the sleeve 66 is flared outwardly to form a generally conical inner race for ball bearings 70. The outer race 71 of the ball bearing is seated against a shoulder 72, and is solidly clamped against the latter by a nut 73 which is screw-threaded into the bore. A hole 74 in the center of the nut 73 provides a passage through which the control wire 65 and sleeve 66 pass. The ball bearing 70 thus provides a swivel connection between the coupling member 50 and the control wire 65, and prevents the latter from becoming twisted due to rotation of the attach plate about the forearm axis.

Formed in the front end of the coupling member 50 is a U-shaped slot 75, the sides of which are parallel to the sides of the slot 52 in the attach plate 23, and the open end of which faces in the same direction as the open end of the slot 52. A channel 76 is formed in the sides of the slot 75 to receive the flange 46 on the end of the connector 42 as the latter slides down into the axial alinement with the coupling member. This interlocking engagement of the connector 42 with the coupling member 50 takes place during the last portion of sliding engagement between the base plate 22 and the attach plate 23, and as the two plates reach exact registration, the connector 42 becomes coaxial with the coupling member 50. With the two parts thus interlocked, the connector 42 is made to move with the coupling member 50 when the latter is pulled rearwardly in its bore by the control wire 65. This motion of the connector 42, transmitted to the actuating mechanism of the hook unit 11 by the link 30, causes the actuating mechanism to open or close the movable hook 25.

In order to insure that the coupling member 50 will always be properly located so as to receive the connector 42 I provide locking means in the form of a lever 80 which is pivoted at 81 on the face of the attach plate 23 below the coupling member 50. The lever 80 is swingable toward and away from the coupling member 50, and one edge thereof is engageable in a slot 82 (Figure 5) formed in the side of the coupling member. The locking lever 80 is urged into seating engagement with the slot 82 by a spring 83, and the locking lever is moved out of engagement with the coupling member and down to the position shown in Figure 8, by a shoulder 84 on the base plate 22 which engages the free end 85 of the locking lever 80 as the base plate 22 approaches full seating engagement with the attach plate. The shoulder 84 is formed in one of the side edges of the slot 40 in the base plate 22; the said edge being additionally cut out at 86 to provide clearance for the end 85 of the locking lever as the latter swings down to the position shown in Figure 8. Below the cutout 86, the side edge of the slot 40 is cut back, as shown at 90 in Figure 6, so as to clear the end 85 of the locking lever until the latter is engaged by the shoulder 84.

The base plate 22 is adapted to be locked against sliding movement with respect to the attach plate 23 by means of a pin 91 which is slidably disposed within a hole 92 at the top end of the base plate 22. The pin 91 is adapted to seat within a hole 93 in the attach plate 23 when the two companionate plates are fully engaged, and the pin 91 is urged into seating engagement with the hole 93 by a spring wire 94. One end of the spring wire 94 is bent into an upwardly projecting loop 95 which extends through a slot 96 in the housing 26 to form a handle which can be manipulated to lift the pin 91 out of the hole 93.

The hook unit 11 is mounted on the attach plate 23 by merely inserting the rib 36, with its flanges 37, down into the slot 52 and channels 53 of the attach plate. The hook unit is then pushed down into full seating engagement with the attach plate in a straight-line, sliding motion until the two parts are exactly registered. The pin 91 must be retracted during the last portion of the travel of the base plate 22 to allow it to pass over the top end of the attach plate 23. When the two parts become exactly registered, the pin 91 drops into the hole 93, locking the plates against relative sliding motion. During the last portion of the travel of the base plate 22, the connector 42 also slides down into engagement with the coupling member 50, and the locking lever 80 is moved down out of engagement with the coupling member to free the latter. The actuating mechanism of the hook unit 11 can thereafter be operated by applying a pull to the control wire 65, which is transmitted from the coupling member 50 to connector 42 and link 30.

To disconnect the hook unit, the wire handle 95 is pushed forwardly to unseat the pin 91 from hole 93, and the attach plate 23 is then moved downwardly with respect to the base plate 22 in a straight-line sliding motion to disengage the two parts. As the connector 42 starts to move out of engagement with the coupling member 50, the locking lever 80 seats in the notch 82, thereby locking the coupling member in a fixed position to be engaged by the connector when the plates 22, 23 are again moved together.

Figure 9 shows another embodiment of the invention, the principal difference being that the attach plate 23a is mounted on the wrist cap 16a for rotation about the pronation-supination axis of the wrist. To this end, the attach plate 23a is connected to the wrist cap 16a by two ball bearings 100 and 101. A bevel gear 102 is fixedly mounted on the rear end of the tubular extension 56a, and intermeshed therewith is another bevel gear 103 which is rotatably supported on a bracket 104 fixed to the inside of the forearm shell 10a. The bevel gear 103 may be driven by any suitable driving arrangement, of which several are well known in the art, for the purpose of rotating the hook unit 11 about the pronation-supination axis of the wrist. Except for the differences noted, the mechanism of Figure 9 is substantially the same as that in the preceding embodiment and therefore need not be described in further detail.

While I have shown and described the invention in connection with a utility hook it will be understood that the same type of quick-disconnect coupling can be used to equal advantage in an artificial hand and, in fact, one of the principal uses of the invention is to enable the amputee to change quickly from hook to hand, or vice versa. It will also be appreciated that the detailed description of the two embodiments of the invention illustrated in the drawings is merely for the purpose of explanation, and that various changes may be made in the shape and arrangement of the several parts without departing from the scope of the invention as defined in the appended claims.

I claim:

1. A quick-disconnect coupling for securing an artificial hand or hook to a forearm member, said hand or hook having actuating mechanism associated therewith, and said forearm member having a manually operable control member, said coupling comprising a pair of companionate interlocking plates on adjoining ends of said hand or hook and said forearm member, respectively, said plates being adapted to interlock in a straight-line sliding engagement, a connector on one of said plates operatively connected to said actuating mechanism, a coupling member on the other plate operatively connected to said control member, said coupling member and said connector projecting outwardly from the faces of their respective plates and interlocking with one another as said plates slide together into full seating engagement with one another, whereby said actuating mechanism can thereafter be operated by said control member, and releasable lock means for locking said plates against relative movement.

2. A quick-disconnect coupling for securing an artificial hand or hook to a forearm member, said hand or hook having actuating mechanism associated therewith, and said forearm member having a manually operable control member, said coupling comprising a pair of companionate interlocking plates which are engageable in a straight-line sliding motion, one of said plates being affixed to said hand or hook, and the other plate being mounted on said forearm member for rotation about the pronation-supination axis, a connector on said one plate operatively connected to said actuating mechanism, and a coupling member on said other plate connected to said control member and located substantially on said axis of rotation, said coupling member and said connector projecting outwardly from the faces of their respective plates and interlocking with one another as said plates slide together into full seating engagement with one another, whereby said actuating mechanism can thereafter be operated by said control member.

3. A quick-disconnect coupling for securing an artificial hand or hook to a forearm member, said hand or hook having actuating mechanism associated therewith, and said forearm member having a manually operable control member, said coupling comprising a pair of companionate interlocking plates on adjoining ends of said hand or hook and said forearm member, respectively, said plates being adapted to interlock in a straight-line sliding engagement, a connector on one of said plates operatively connected to said actuating mechanism, a coupling member on the other plate operatively connected to said control member, said coupling member and said connector being adapted to interlock as said plates approach full seating engagement with one another, whereby said actuating mechanism can thereafter be operated by said control member, and a spring-pressed locking member on said other plate engageable with said coupling member as said plates separate to lock the coupling member in a fixed position projecting outwardly from the face of said other plate, so as to be engaged by said connector when the plates are again moved together.

4. A quick-disconnect coupling for securing an artificial hand or hook to a forearm member, said hand or hook having actuating mechanism associated therewith, and said forearm member having a manually operable control member, said coupling comprising a pair of companionate interlocking plates on adjoining ends of said hand or hook and said forearm member, respectively, said plates being adapted to interlock in a straight-line sliding engagement, a connector on one of said plates operatively connected to said actuating mechanism, a coupling member on the other plate operatively connected to said control member, said coupling member and said connector being adapted to interlock as said plates approach full seating engagement with one another, whereby said actuating mechanism can thereafter be operated by said control member, and a spring-pressed locking member pivoted on said other plate for swinging movement into and out of engagement with said coupling member, said locking member being engageable with said coupling member as said plates move apart to lock the coupling member in a fixed position to be engaged by said connector when the plates are again interlocked, and said locking member being engaged by said other plate and moved out of engagement with said coupling member as the two plates approach full seating engagement.

5. A quick-disconnect coupling for securing an artificial hand or hook to a forearm member, said hand or hook having actuating mechanism associated therewith, and said forearm member having a manually operable control member, said coupling comprising a pair of companionate interlocking plates which are engageable in a straight-line sliding motion, one of said plates being affixed to said hand or hook, and the other plate being mounted on said forearm member for rotation about the pronation-supination axis, a coupling member on said other plate located substantially on said axis of rotation, said coupling member being connected to said control member and being movable in a direction perpendicular to the face of said other plate, a connector on said one plate operatively connected to said actuating mechanism, said connector being adapted to interlock with said coupling member as said plates approach full seating engagement with one another, whereby said actuating mechanism can thereafter be operated by said control member, and a spring-pressed locking member pivoted on said other plate for swinging movement into and out of engagement with said coupling member, said locking member being engageable with said coupling member as said plates move apart to lock the coupling member in a fixed position to be engaged by said connector when the plates are again moved together, and said locking member being engaged by said other plate and moved out of engagement with said coupling member as the two plates approach full seating engagement.

6. A quick-disconnect coupling for securing an artificial hand or hook to a forearm member, said hand or hook having actuating mechanism associated therewith, and said forearm member having a manually operable control member, said coupling comprising a pair of companionate interlocking plates which are engageable in a straight-line sliding motion perpendicular to the axis of said forearm member, one of said plates being affixed to said hand or hook, and the other plate being mounted on said forearm member for rotation about the pronation-supination axis, said one plate having a pair of parallel straight flanges projecting outwardly from opposite side edges thereof, said other plate having a pair of parallel straight channels disposed to receive said flanges in a sliding engagement to interlock said plates, a spring-pressed lock on one of said plates engageable with the other plate to lock the plates against relative sliding movement, a slotted coupling member on said other plate located substantially on said axis of rotation, said coupling member being connected to said control member and being movable in a direction substantially parallel to said axis of rotation, a flanged connector on said one plate operatively connected to said actuating mechanism, said connector being movable in the same direction as said coupling member and being adapted to interlock with the latter as said plates approach full seating engagement with one another, whereby said actuating mechanism can thereafter be operated by said control member, said coupling member having a slot formed in one side thereof, a locking member pivoted on said other plate for swinging movement into and out of engagement with said slot, and a spring urging said locking member into seating engagement with said slot as said plates move apart, said locking member serving to hold said coupling member in a fixed position to be engaged by said connector when the plates are again moved together, said locking member being engaged by said other plate and moved out of engagement with said coupling member as the two plates approach full seating engagement.

7. A quick-disconnect coupling for securing an artificial hand or hook to a forearm member, said hand or hook having actuating mechanism associated therewith, and said forearm member having a manually operable control member, said coupling comprising a pair of companionate interlocking plates which are engageable in a straight-line sliding motion perpendicular to the axis of said forearm member, one of said plates being affixed to said hand or hook, and the other plate being mounted on said forearm member, said other plate having a bore located substantially on and parallel to the axis of said forearm member, a coupling member connected to said control member and slidably disposed within said bore, the end of said coupling member projecting beyond the outer face of said other plate and having a slotted recess formed therein, a flanged connector on said one plate operatively connected to said actuating mechanism and adapted to seat within said slotted recess of said coupling member as said plates slide together into full seating engagement with one another, thereby interlocking said actuating mechanism with said control member, and a spring-pressed locking member engageable with said coupling member as said plates move apart to hold the coupling member in a fixed position within said bore to be engaged by said connector when the plates are again moved together.

8. A quick-disconnect coupling for securing an artificial hand or hook to a forearm member, said hand or hook having actuating mechanism associated therewith, and said forearm member having a manually operable control member, said coupling comprising a pair of companionate interlocking plates which are engageable in a straight-line sliding motion perpendicular to the axis of said forearm member, one of said plates being affixed to said hand or hook, and the other plate being mounted on said forearm member for rotation about the pronation-supination axis, said other plate having a bore located substantially on and parallel to said axis of rotation, a coupling member slidably disposed within said bore and non-rotatable with respect thereto, a swivel connection between said coupling member and the end of said control member, a spring urging said coupling member toward the outer face of said other plate, the end of said coupling member being adapted to project beyond said outer face of said other plate and having a slotted recess formed therein, a flanged connector on said one plate operatively connected to said actuating mechanism and adapted to seat within said slotted recess of said coupling member as said plates approach full seating engagement with one another, thereby interlocking said actuating mechanism with said control member, and a spring-pressed locking member pivoted on said other plate for swinging motion into and out of engagement with said coupling member, said locking member being engageable with said coupling member as said plates move apart to lock the coupling member in a fixed position to be engaged by said connector when the plates are again moved together, said locking member being engaged by said other plate and moved out of engagement with said coupling member as the two plates approach full seating engagement.

GILBERT M. MOTIS.

REFERENCES CITED

The following references are of record in the file of this patent:

UNITED STATES PATENTS

| Number | Name | Date |
| --- | --- | --- |
| 2,427,974 | Otterman | Sept. 23, 1947 |